May 4, 1954  R. SHER ET AL  2,677,797
MOTOR CONTROL SYSTEM FOR SCANNING DEVICES
Filed Dec. 28, 1945  2 Sheets-Sheet 1

INVENTORS
RUDOLPH SHER
DAVID B. NICHINSON
CLARENCE W. SCHULTZ
BY M.O.Hayes

ATTORNEY

May 4, 1954

R. SHER ET AL 2,677,797

MOTOR CONTROL SYSTEM FOR SCANNING DEVICES

Filed Dec. 28, 1945

INVENTORS
RUDOLPH SHER
DAVID B. NICHINSON
CLARENCE W. SCHULTZ

BY

ATTORNEY

Patented May 4, 1954

2,677,797

UNITED STATES PATENT OFFICE 2,677,797

MOTOR CONTROL SYSTEM FOR SCANNING DEVICES

Rudolph Sher, Boston, David B. Nichinson, Brookline, and Clarence W. Schultz, Cambridge, Mass., assignors, by direct and mesne assignments, to the United States of America as represented by the Secretary of the Navy Application December 28, 1945, Serial No. 637,743

10 Claims. (Cl. 318—282)

This invention relates to electronic control circuits and more particularly, to those providing electronic control of variable sector scan in a mechanical resonant scanner.

The development of a mechanical resonant scanner (MRS) was the outgrowth of a need in radar systems for an airborne rapid scanning antenna. In such systems, it is generally the practice to tune the antenna inertia with springs so that its natural frequency of oscillation would be that desired for rapid sector scan. If the input energy is not equal to that dissipated in operation the system naturally changes amplitude in a proper direction until equilibrium results and stable operation ensues. It is this characteristic which is employed in amplitude control. Therefore, the choice of a driving motor duty cycle and the quantity of motor energy input selects and controls the amplitude of the scan.

In order to maintain the amplitude of the scanner oscillations for a desired sector scan it is necessary to control within definite limits the duration and timing of the electric motor input pulse. To synchronize the motor input pulse with the angular direction of the scanner, the direction of the motor rotation must be reversed at such time as to allow the motor input pulse to be applied to the scanner in the same direction as the scanner is naturally turning. Considerable difficulty has been encountered in maintaining the adjustment and timing of a motor control system mechanically operated at the speed required in a rapid scanner. In accordance with the present invention, and as is explained more fully hereinafter, the electronic control circuit will satisfactorily meet the standards of precision and accuracy required in the synchronization of the motor with a mechanical resonant scanner.

A primary object of the present invention is to provide an electronic control system permitting variable sector scan in a mechanical resonant scanner (MRS).

Another object of the present invention is to provide means for controlling the duration of the motor pulse applied to a MRS.

A further object of the present invention is to provide means for controlling the time at which the motor pulse is applied to a MRS.

A still further object of the present invention is to provide means for synchronizing the direction of application of the motor pulse to the natural rotation of the MRS.

These and other objects will be apparent from the following specification when taken with the accompanying drawings, in which.

Figure 1:
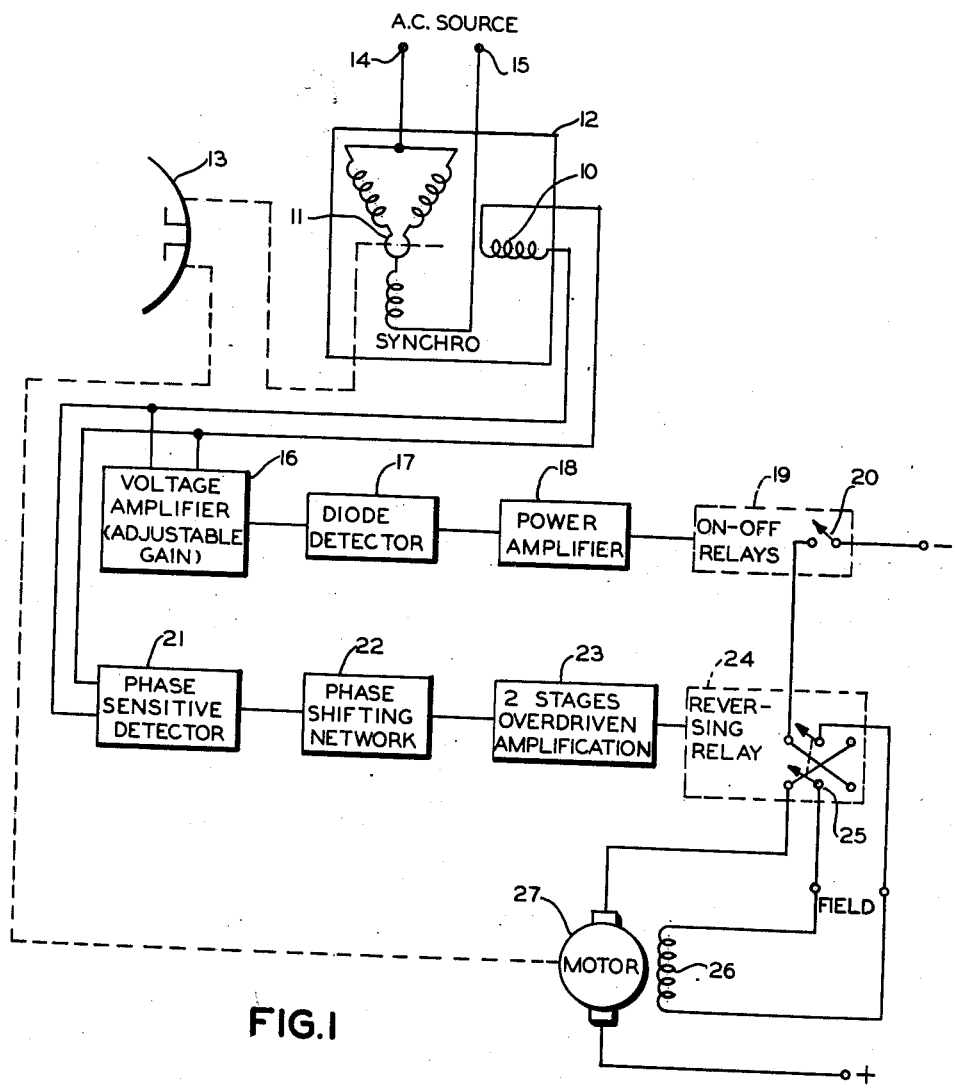
Fig. 1 is a block diagram of an embodiment of the invention.
Figure 2:
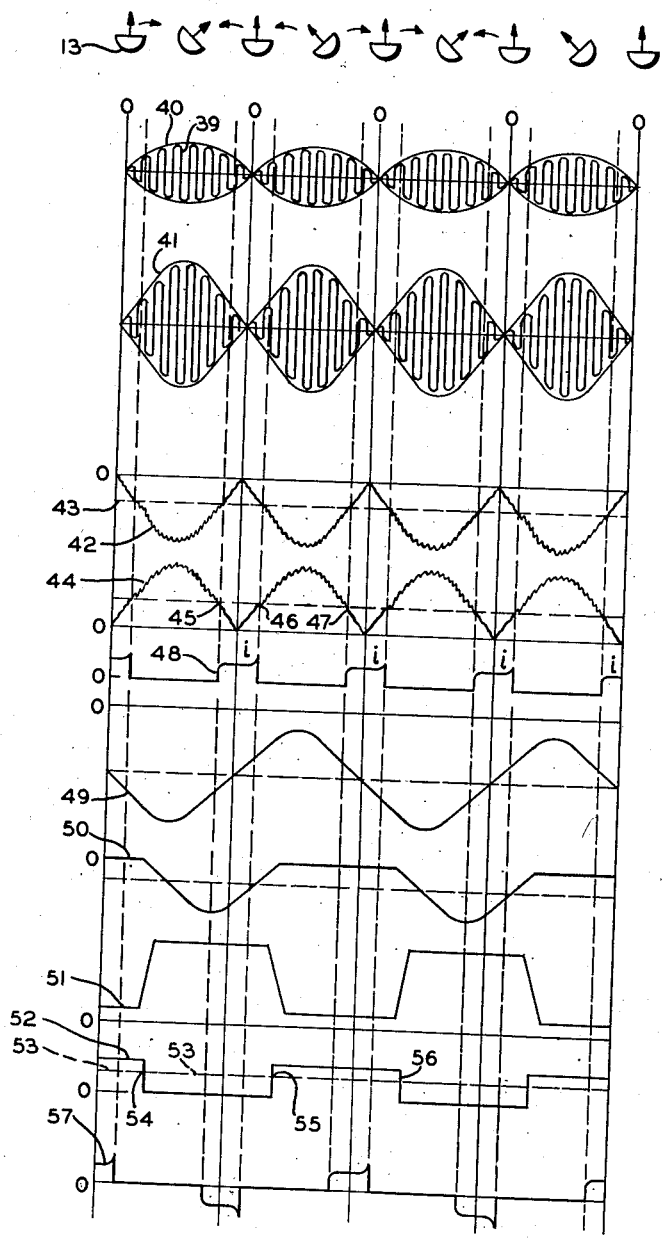
Fig. 2 is a phase diagram of certain voltage and current wave forms present in the embodiment represented in Fig. 1. The wave forms are illustrated in relation to the scanner position.

In Fig. 1 the synchro 12 is mounted on the azimuth axis of the mechanical resonant scanner MRS 13 and is electrically zeroed so that its output voltage is zero when scanning antenna 13 is in a particular angular position. The stator 11 of synchro 12 is attached to and rotates with scanner 13. Two of the stator windings are as schematically illustrated joined by a conductor and are connected to input terminal 14. An alternating current of predetermined frequency and comparatively low voltage is applied to the stator coils across terminals 14 and 15. As the stator 11 of synchro 12 rotates with scanner 13 through the scanning sector a variable amplitude alternating voltage is developed in the rotor coil 10 of synchro 12. The instantaneous amplitude of the output voltage from the rotor of synchro 12 is determined by the azimuth angle of scanner 13 relative to the particular zero position previously mentioned. As illustrated in Fig. 2 this output voltage comprises an alternating voltage 39 having an envelope 40 of an amplitude proportional to deviation of the azimuth angle of scanner 13 from the midposition, diagrammatically illustrated by the scanner 13 above the waveforms of Fig. 2. Thus, wave form 40 represents the carrier frequency 39 applied to the stator coils of the synchro 12 at terminals 14 and 15 amplitude modulated at the scanning rate of scanner 13. This amplitude modulated wave form 39, 40 is fed to a voltage amplifier 16 having a conventional type, adjustable gain control. The output of voltage amplifier 16 is illustrated in Fig. 2 by voltage form 41, similar to 40 but of increased peak amplitude.

Voltage wave form 41 is fed to a diode detector 17 which produces a negative unidirectional voltage with respect to ground, and is essentially the negative half of the envelope of wave form 41, as illustrated in Fig. 2 by voltage wave form 42. The output of diode detector 17, as represented by Fig. 2 wave form 42 is applied to the grid of power amplifier 18, the plate load of which is a set of relays 19 which operate normally open switch 20 at the proper time to turn the antenna drive motor 27 on and off. It is desirable to have the motor mechanical driving impulse applied to scanner 13 at a point in the cycle thereof just prior to the midposition, and to continue the application of the mechanical force until scanner 13 has just passed through the midposition. Electric motor 27 is normally energized until the angle of rotation of scanner 13 reaches a critical value determined by the gain of voltage amplifier 16, at which time the bias on the grid of power amplifier 18 is large enough to reduce the plate current thereof to the point at which relay 19 is de-energized, switch 20 opens and motor 27 stops.

The broken line 43, shown in Fig. 2 as intersecting wave form 42, represents the critical negative voltage which determines the effective cut off of power amplifier 18. Wave form 44 represents the plate voltage wave form of power amplifier 18 in phase relationship to the negative voltage wave form 42 which is applied to the grid thereof. At point 45 on wave form 44 the plate current is sufficient to energize relay 19 and close switch 20 energizing motor 27. Motor 27 remains energized until the plate voltage reaches point 46 at which time the plate current is reduced to the point where relay 19 is de-energized, whereupon switch 20 opens and motor 27 stops. Motor 27 remains de-energized until the plate voltage reaches point 47 at which time the plate current is again sufficient to energize relay 19 closing switch 20 thus re-energizing motor 27. Wave form 48 represents the flow of electric current to motor 27 and the phase relationship of the motor driving impulse relative to the position of antenna 13.

The variable voltage output 40 of synchro 12 is also applied to a phase-sensitive detector 21. Waveform 49 represents the sinusoidal output from phase-sensitive detector 21 which is fed through a phase shifting network 22. Waveform 50 in Fig. 2 represents the shifted voltage output of the network 22 which is applied to the grid of the first of two stages of overdriven amplification 23. The positive peaks of wave form 50 are clipped due to grid current in the overdriven amplifier 23. The plate voltage of the first overdriven amplifier is represented in Fig. 2 by waveform 51. The plate voltage of the second overdriven amplifier is represented by waveform 52. Reversing relay 24 is the plate load of the second stage of the overdriven amplifiers 23. The broken line 53 running through wave form 52 represents the critical plate voltage, below which the plate current through reversing relay 24 is great enough to energize the relay and throw reversing switch 25 to the first position, and above which the plate current through reversing relay 24 is too small to hold the reversing relay 24 energized. In the latter condition, the reversing switch 25 assumes the second position, reversing the flow of current though field coils 26 of motor 27; thus reversing the direction of rotation of motor 27. Position 54 on waveform 52 represents the point at which reversing relay 24 becomes energized. The relay 24 remains in this state until position 55 on wave form 52 is reached when it is de-energized and remains in this state until position 56 is reached at which time it is again energized. Wave form 57 in Fig. 2 represents the flow of current in field coils 26 of motor 27 with respect to time and position of antenna 13. Thus it is clear from a study of the phase relationships represented in Fig. 2, that each time the motor 27 is cut off, the reversing relay 24 changes the position of reversing switch 25 so that the next electric impulse applied to motor 27 reverses the direction of rotation thereof, thus synchronizing the direction of the motor impulse with the direction of rotation of the scanner. From a further study of the waveforms in Figs. 2, it will be seen that as the gain in voltage amplifier 16 is increased, the slope of the voltage waveforms 41, 42, and 44 is increased, thus effectively reducing that part of the cycle during which the motor impulse will be applied to scanner 13. The lower the gain of voltage amplifier 16, the smaller is the slope of the voltage waveforms 41, 42 and 44, thus increasing that part of the cycle during which the motor impulse is applied to scanner 13, thereby giving complete control over the size of sector being scanned by the mechanical resonant scanners.

Thus, it is to be clearly understood that the description and illustration of the invention made above has been given only by way of example and not as a limitation on the scope of the invention, as set forth in the objects and the accompanying claims.

What is claimed is:

1. An electronic control circuit for a mechanical resonant scanner comprising, an alternating current source, means for modulating the alternating current from said source at the oscillating frequency of said mechanical resonant scanner, an electric motor, said motor maintaining said mechanical resonant scanner in oscillation, means for controlling the energizing and de-energizing of said motor, and means for reversing said motor for synchronizing the direction of rotation of said motor with the instantaneous direction of rotation of said mechanical resonant scanner.

2. The apparatus of claim 1 in which said means for modulating the alternating current from said source at the oscillating frequency of said mechanical resonant scanner comprises, a synchro unit, an element of said synchro unit being mechanically attached to said mechanical resonant scanner, said synchro unit element being so positioned that the voltage output thereof is zero when said mechanically resonant scanner is in a predetermined position, the voltage output of said synchro unit increasing with the increase in the angle of rotation of said mechanical resonant scanner.

3. The apparatus of claim 1 in which said means for controlling the energizing and de-energizing of said motor comprises, an adjustable gain voltage amplifier for amplifying the modulated voltage output of said modulating means, a detector for producing a variable voltage from the output of said voltage amplifier, a power amplifier and an on-off relay, the plate current of said power amplifier being controlled by the output of said detector, said on-off relay in the plate circuit of said power amplifier being energized and de-energized by the increase and decrease of the plate current of said power amplifier, a switch in the electrical circuit of said motor, said switch being closed by said relay when said relay becomes energized and said switch being opened when said relay becomes de-energized, said switch thereby controlling the starting and the stopping of said motor, and means for controlling the duty cycle of said motor comprising an adjustable gain control on said voltage amplifier operative when the voltage amplifier gain is increased to reduce the duty cycle of said motor and when the amplifier gain is decreased to increase the duty cycle of said motor.

4. The apparatus of claim 1 in which said means for reversing said motor for synchronizing the direction of rotation of said motor impulse with the instantaneous direction of rotation of said mechanical resonant scanner comprising a phase sensitive detector, said detector receiving the modulated voltage output of said modulated alternating current source and producing therefrom a substantially sinusoidal voltage wave form, a phase shifting network for shifting the sinusoidal voltage waveform approximately a quarter cycle in phase, an overdriven amplifier energized by said output of said phase shifting network, and a reversing relay, said overdriven amplifier producing a square wave of output voltage thus controlling the energizing and de-energizing of said reversing relay, a reversing switch said switch located in the field coil circuit of said motor, said reversing switch being controlled by said reversing relay.

5. An electronic control circuit for a mechanical resonant scanner comprising an alternating current source and a synchro unit, an element of said synchro being mechanically attached to said mechanical resonant scanner, said synchro unit element being so positioned that the voltage output of said synchro unit is zero when said mechanical resonant scanner is in a predetermined position, the voltage output of said synchro unit increasing with the increase in the angle of rotation of said mechanical resonant scanner, whereby the voltage output from said synchro unit is modulated at the oscillatory rate of said mechanical resonant scanner, a voltage amplifier for amplifying the modulated voltage output of said synchro unit, a detector for producing a variable negative voltage from the output of said voltage amplifier, a power amplifier and an on-off relay, the plate current of said power amplifier controlled by the output of said detector, said on-off relay in the plate circuit of said power amplifier being energized and de-energized by the increase and decrease of the plate current of said power amplifier, a switch in the electrical circuit of said motor, said switch being closed by said relay when said relay becomes energized and said switch being opened when said relay becomes de-energized, said switch thereby controlling the starting and stopping of said motor, an adjustable gain control on said voltage amplifier, said gain control when increased reducing the duty cycle of said motor and when decreased increasing the duty cycle of said motor, a phase sensitive detector, said detector receiving the modulated voltage output from said synchro unit and producing therefrom a sinusoidal voltage waveform, a phase shifting network for shifting the sinusoidal voltage waveform, approximately a quarter cycle in phase, an overdriven amplifier, and a reversing relay, said overdriven amplifier producing a square wave of voltage when energized by the output of said phase shifting network and controlling the energizing and de-energizing of said reversing relay, a reversing switch, said switch being in the field coil circuit of said motor, said reversing switch being controlled by said reversing relay, whereby the direction of rotation of said motor is synchronized with the instantaneous direction of rotation of said mechanical resonant scanner.

6. In a control circuit for a mechanical resonant sector scanner having a natural frequency of oscillation, means for generating a signal having an amplitude proportional to the angular displacement of said scanner from the central axis of said sector, motor means connected to said scanner for imparting rotational energy thereto, means for deriving control pulses from said signal for energizing said motor means for a predetermined time interval during each cycle of oscillation, said time interval being centered with respect to the time at which said scanner sweeps through the central axis of said sector and means for varying the duration of said time interval whereby the size of said sector is adjusted.

7. In a control system for a mechanical resonant sector scanner having a natural frequency of oscillation, means for producing a signal the amplitude of which is proportional to the angular displacement of said scanner from the symmetrical axis of said sector, a reversible motor coupled to said scanner for supplying rotational energy thereto, means for deriving from said signal first control pulses for energizing said motor for a predetermined time interval during each cycle of oscillation and second control pulses for controlling the direction of rotation of said motor means whereby said motor when energized rotates in a direction corresponding to the direction of oscillation of said scanner whereby said scanner is maintained in continuous oscillation.

8. In a control circuit of the type described in claim 7 wherein means are included for regulating the duration of said first control pulses whereby the period of energization of said motor is varied and the size of said sector changed, said first control pulses being centered in time with respect to the time at which said scanner passes through the symmetrical axis of said sector.

9. In a control circuit for a mechanical resonant sector scanner having a natural frequency of oscillation, means for generating a signal the amplitude of which is proportional to the angular deviation of said scanner from the central axis of said sector, motor means coupled to said scanner, means for reversing the direction of rotation of said motor, means for deriving from said signal a first control pulse for operating said reversing means whereby said motor rotates in a direction corresponding to the direction of oscillation of said scanner and means for controlling the energization of said motor whereby said motor periodically supplies rotational energy to said scanner during an adjustable portion of the cycle centered with respect to the time at which said scanner passes through the central axis of said sector, said last mentioned means determining the size of the sector scanned.

10. In a control circuit as defined in claim 9 wherein said means for generating said signal comprises a synchro unit having first and second elements, said first element being energized from an alternating current source and being mechanically driven by said resonant scanner whereby a variable amplitude voltage is developed in said second element.

References Cited in the file of this patent
UNITED STATES PATENTS

| Number | Name | Date |
|---|---|---|
| 1,976,935 | Gregg | Oct. 16, 1934 |
| 2,147,674 | Satterlee | Feb. 21, 1939 |
| 2,297,719 | Satterlee | Oct. 6, 1942 |
| 2,416,229 | Shoemaker | Feb. 18, 1947 |
| 2,458,175 | Kolding | Jan. 4, 1949 |
| 2,502,975 | McFarlane | Apr. 4, 1950 |